United States Patent
Yu

(10) Patent No.: US 9,322,982 B2
(45) Date of Patent: Apr. 26, 2016

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventor: Gang Yu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 142 days.

(21) Appl. No.: 14/349,385

(22) PCT Filed: Jan. 23, 2014

(86) PCT No.: PCT/CN2014/071164
§ 371 (c)(1),
(2) Date: Apr. 3, 2014

(87) PCT Pub. No.: WO2015/103801
PCT Pub. Date: Jul. 16, 2015

(65) Prior Publication Data
US 2015/0198763 A1     Jul. 16, 2015

(30) Foreign Application Priority Data
Jan. 10, 2014   (CN) .......................... 2014 1 0013116

(51) Int. Cl.
*G02F 1/1335* (2006.01)
*F21V 8/00* (2006.01)

(52) U.S. Cl.
CPC .............. *G02B 6/0085* (2013.01); *G02B 6/005* (2013.01); *G02B 6/009* (2013.01); *G02F 1/1336* (2013.01); *G02F 2001/133628* (2013.01)

(58) Field of Classification Search
CPC ..................... G02F 1/133603; G02F 1/133608
USPC ........................................................... 349/69
See application file for complete search history.

(56) References Cited

U.S. PATENT DOCUMENTS

2009/0128732 A1*   5/2009   Hamada ............... G02B 6/0068
                                                              349/58

FOREIGN PATENT DOCUMENTS

CN              103591512 A        2/2014

* cited by examiner

*Primary Examiner* — Phu Vu
(74) *Attorney, Agent, or Firm* — Andrew C. Cheng

(57) ABSTRACT

The present invention provides a backlight module and a liquid crystal display device using the backlight module. The backlight module includes a backplane (2), a light guide plate (4) arranged in the backplane (2), a backlight source (6) arranged in the backplane (2), and a heat dissipation plate (8) arranged between the backlight source (6) and the backplane (2). The backplane (2) includes a bottom plate (22) and a side plate (24) perpendicularly connected to the bottom plate (22). The backlight source (6) includes a PCB (62) and an LED chip (64) mounted on the PCB (62). The PCB (62) is arranged on the bottom plate (22) of the backplane (2) and the heat dissipation plate (8). The PCB (62) includes a mounting section (622) and a lapping section (624) connected to the mounting section (622). The heat dissipation plate (8) includes a support section (82) and a bearing section (84) connected to the support section (82). The lapping section (624) is positioned on and overlaps the bearing section (84). The light guide plate (4) is carried on the support section (82) and the lapping section (624).

13 Claims, 3 Drawing Sheets

BACKLIGHT MODULE AND LIQUID CRYSTAL DISPLAY DEVICE USING SAME

BACKGROUND OF THE INVENTION

1. Field of the Invention

The present invention relates to the field of flat panel displaying, and in particular to a backlight module and a liquid crystal display device using the backlight module.

2. the Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal display panel.

Referring to FIG. 1, a schematic view is given to illustrate a conventional liquid crystal display device, which comprises a backlight module 100, a mold frame 300 arranged on the backlight module 100, a liquid crystal display panel 500 arranged on the mold frame 300, and a bezel 700 arranged on the liquid crystal display panel 500. The backlight module 100 comprises: a backplane 101, a light guide plate 103 arranged in the backplane 101, a backlight source 105 arranged in the light guide plate 103. The backlight source 105 comprises a printed circuit board (PCB) 151 and a light-emitting diode (LED) chip 153 directly mounted on the PCB 151. The PCB 151 is arranged on a bottom plate 111 of the backplane 101 and the LED chip 153, which is set to correspond to a light incidence surface 131 of the light guide plate 103, is arranged between a side plate 113 of the backplane 101 and the light incidence surface 131 of the light guide plate 103. Compared to a conventional backlight module that comprises a backlight source arranged on a side plate, the backlight module 100 provides a reduced spacing distance between the light guide plate 103 and the side plate 113 of the backplane 101, making it advantageous in achieving bezel slimming of the liquid crystal display device. Further, to enhance heat dissipation performance of the backlight module 100, a heat dissipation board 107 is arranged between the PCB 151 and the bottom plate 111 of the backplane 101 to better transfer the heat emitting from the LED chip 153 to the backplane 101 to subject to heat exchange between the backplane 101 and the surroundings to dissipate the heat. This, although improving the heat dissipation performance, increases the thickness of the backlight module 100, thereby increasing the thickness of the entirety of the liquid crystal display device, this being opposite to the current trend of device thinning.

SUMMARY OF THE INVENTION

An object of the present invention is to provide a backlight module, which has a simple structure, excellent heat dissipation performance, and a reduced thickness, and is advantageous for achieving bezel slimming of a liquid crystal display device.

Another object of the present invention is to provide a liquid crystal display device, which has a simple structure and a reduced thickness and is advantageous for achieving bezel slimming.

To achieve the above object, the present invention provides a backlight module, which comprises: a backplane, a light guide plate arranged in the backplane, a backlight source arranged in the backplane, and a heat dissipation plate arranged between the backlight source and the backplane. The backplane comprises a bottom plate and a side plate perpendicularly connected to the bottom plate. The backlight source comprises a PCB (Printed Circuit Board) and an LED (Light-Emitting Diode) chip mounted on the PCB. The PCB is arranged on the bottom plate of the backplane and the heat dissipation plate. The PCB comprises a mounting section and a lapping section connected to the mounting section. The heat dissipation plate comprises a support section and a bearing section connected to the support section. The bearing section is arranged to correspond to the lapping section, whereby in assembling, the lapping section is positionable on and overlaps the bearing section and the light guide plate is carried on the support section and the lapping section.

The bottom plate of the backplane comprises a recessed chamber formed therein to correspond to the backlight source and the heat dissipation plate and the backlight source and the heat dissipation plate are received and retained in the recessed chamber.

The light guide plate comprises a bottom surface that faces the bottom plate of the backplane, a top surface opposite to the bottom surface, and a plurality of side surfaces between the bottom surface and the top surface. The plurality of side surfaces comprises at least a light incidence surface. The LED chip is arranged between the light guide plate and the side plate of the backplane to correspond to the light incidence surface.

The backlight module further comprises a bottom reflector plate arranged between the bottom surface of the light guide plate and the bottom plate of the backplane.

The present invention also provides a liquid crystal display device, which comprises: a backlight module, a mold frame arranged on the backlight module, a liquid crystal display panel arranged on the mold frame, and a front bezel arranged on the liquid crystal display panel. The backlight module comprises a backplane, a light guide plate arranged in the backplane, a backlight source arranged in the backplane, and a heat dissipation plate arranged between the backlight source and the backplane. The backplane comprises a bottom plate and a side plate perpendicularly connected to the bottom plate. The backlight source comprises a PCB and an LED chip mounted on the PCB. The PCB is arranged on the bottom plate of the backplane and the heat dissipation plate. The PCB comprises a mounting section and a lapping section connected to the mounting section. The heat dissipation plate comprises a support section and a bearing section connected to the support section. The bearing section is arranged to correspond to the lapping section, whereby in assembling, the lapping section is positionable on and overlapping the bearing section and the light guide plate is carried on the support section and the lapping section.

The bottom plate of the backplane comprises a recessed chamber formed therein to correspond to the backlight source and the heat dissipation plate and the backlight source and the heat dissipation plate are received and retained in the recessed chamber.

The light guide plate comprises a bottom surface that faces the bottom plate of the backplane, a top surface opposite to the bottom surface, and a plurality of side surfaces between the bottom surface and the top surface. The plurality of side surfaces comprises at least a light incidence surface. The LED chip is arranged between the light guide plate and the side plate of the backplane to correspond to the light incidence surface.

The backlight module further comprises a bottom reflector plate arranged between the bottom surface of the light guide plate and the bottom plate of the backplane.

The liquid crystal display device further comprises an optical film assembly arranged between the backlight module and the liquid crystal display panel.

The present invention further provides a liquid crystal display device, which comprises: a backlight module, a mold frame arranged on the backlight module, a liquid crystal display panel arranged on the mold frame, and a front bezel arranged on the liquid crystal display panel, the backlight module comprising a backplane, a light guide plate arranged in the backplane, a backlight source arranged in the backplane, and a heat dissipation plate arranged between the backlight source and the backplane, the backplane comprising a bottom plate and a side plate perpendicularly connected to the bottom plate, the backlight source comprising a PCB (Printed Circuit Board) and an LED (Light-Emitting Diode) chip mounted on the PCB, the PCB being arranged on the bottom plate of the backplane and the heat dissipation plate, the PCB comprising a mounting section and a lapping section connected to the mounting section, the heat dissipation plate comprising a support section and a bearing section connected to the support section, the bearing section being arranged to correspond to the lapping section, whereby in assembling, the lapping section is positionable on and overlapping the bearing section and the light guide plate is carried on the support section and the lapping section;

wherein the bottom plate of the backplane comprises a recessed chamber formed therein to correspond to the backlight source and the heat dissipation plate and the backlight source and the heat dissipation plate are received and retained in the recessed chamber.

The light guide plate comprises a bottom surface that faces the bottom plate of the backplane, a top surface opposite to the bottom surface, and a plurality of side surfaces between the bottom surface and the top surface. The plurality of side surfaces comprises at least a light incidence surface. The LED chip is arranged between the light guide plate and the side plate of the backplane to correspond to the light incidence surface.

The backlight module further comprises a bottom reflector plate arranged between the bottom surface of the light guide plate and the bottom plate of the backplane.

The liquid crystal display device further comprises an optical film assembly arranged between the backlight module and the liquid crystal display panel.

The efficacy of the present invention is that the present invention provides a backlight module and a liquid crystal display device using the backlight module, in which an LED chip is directly mounted to a PCB and the PCB is arranged on a bottom plate of a backplane to have the LED chip located between a light incidence surface of a light guide plate and a side plate of the backplane to achieve bezel slimming of a liquid crystal display device and further, a lapping section is provided on the PCB and a bearing section is formed on a heat dissipation plate to allow the lapping section and the bearing section to mate and engage with each other so as to achieve thinning of the liquid crystal display device while not increasing the thickness of the backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
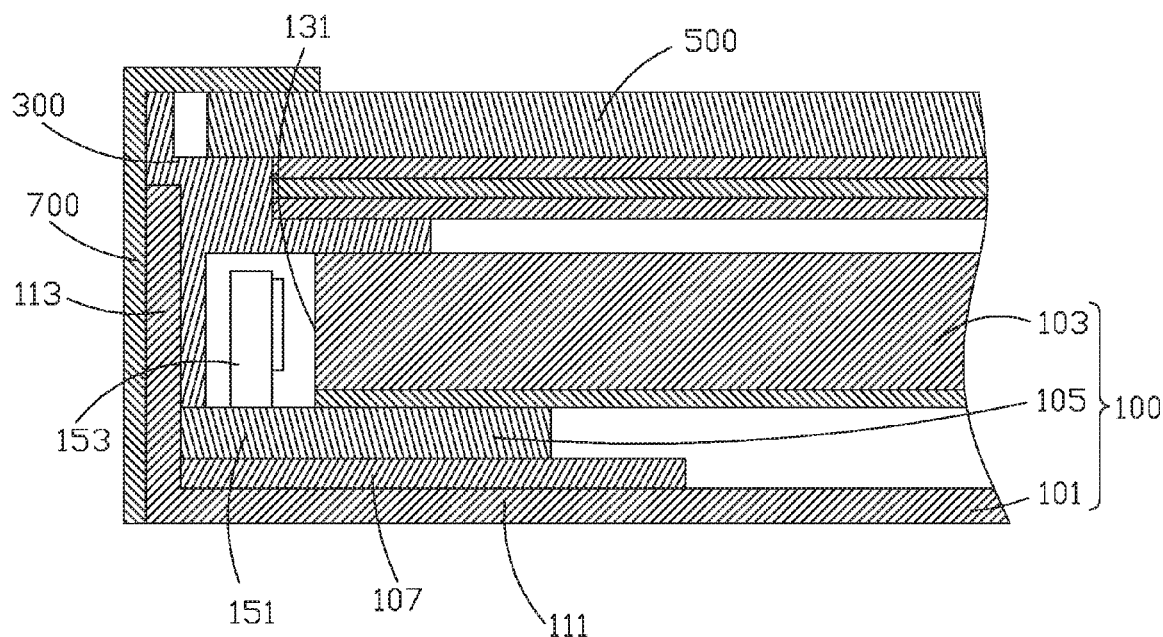
FIG. 1 is a schematic view showing the structure of a conventional liquid crystal display device.
Figure 2:
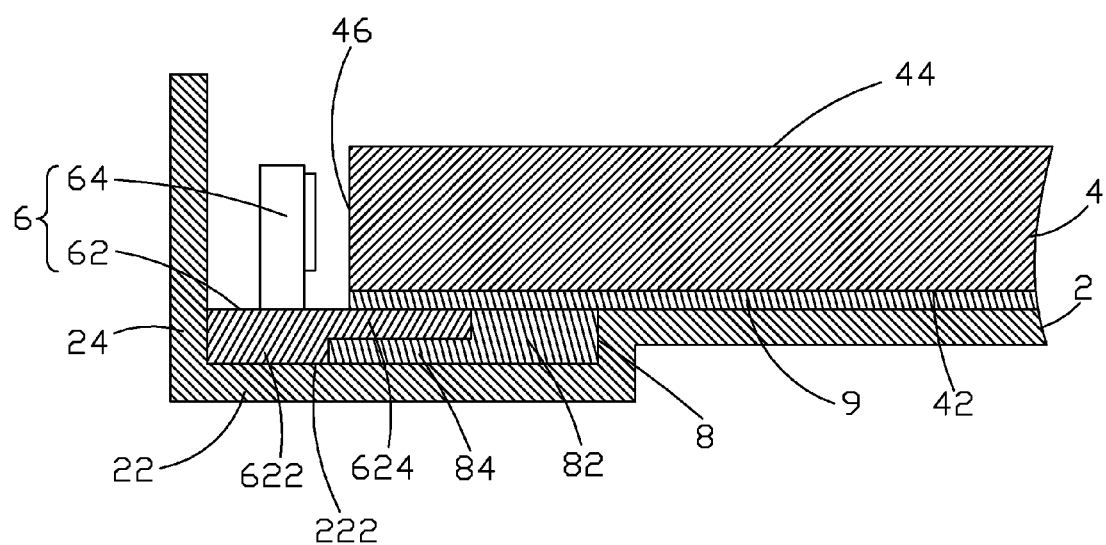
FIG. 2 is a cross-sectional view showing the structure of a backlight module according to the present invention.

Referring to FIG. 2, the present invention provides a backlight module, which comprises: a backplane 2, a light guide plate 4 arranged in the backplane 2, a backlight source 6 arranged in the backplane 2, a heat dissipation plate 8 arranged between the backlight source 6 and the backplane 2, and a bottom reflector plate 9 arranged between the light guide plate 4 and the backplane 2. The backlight source 6 emits light that is reflected by the bottom reflector plate 9 toward or directly enters the light guide plate 4 to be transmitted in the light guide plate 4 in order to convert a point light source into a planar light source.

Specifically, referring to FIG. 2, the backplane 2 comprises a bottom plate 22 and a side plate 24 perpendicularly connected to the bottom plate 22. The bottom plate 22 of the backplane 2 comprises a recessed chamber 222 formed therein to correspond to the backlight source 6 and the heat dissipation plate 8, whereby the backlight source 6 and the heat dissipation plate 8 are received and retained in the recessed chamber 222. The backlight source 6 comprises a PCB (Printed Circuit Board) 62 and an LED (Light-Emitting Diode) chip 64 mounted on the PCB 62. The PCB 62 is mounted on the bottom plate 22 of the backplane 2 and the heat dissipation plate 8. The LED chip 64 generates heat that is transferred through the PCB 62 to the backplane 2 and the heat dissipation plate 8 and is subsequently subjected to heat exchange with the surroundings to be dissipated. Although the PCB 6 might have poor performance of heat dissipation, the heat dissipation plate 8 has excellent performance of heat dissipation and can compensate the poor heat dissipation performance of the PCB 62 to thereby enhance the quality of the backlight module.

The light guide plate 4 comprises a bottom surface 42 that faces the bottom plate 22 of the backplane 2, a top surface 44 opposite to the bottom surface 42, and a plurality of side surfaces between the bottom surface 42 and the top surface 44. The plurality of side surfaces comprises at least a light incidence surface 46. The LED chip 64 is arranged between the light guide plate 4 and the side plate 24 of the backplane 2 to correspond to the light incidence surface 46. Since the PCB 62 is arranged on the bottom plate 22 of the backplane 2 and since only the LED chip 64 is arranged between the side plate 24 of the backplane 2 and the light guide plate 4 to correspond to the light incidence surface 46, the distance between the light guide plate 4 and the side plate 24 of the backplane 2 can be effectively reduced so as to help achieve bezel slimming.

Further, the PCB 62 comprises a mounting section 622 and a lapping section 624 connected to the mounting section 622. The heat dissipation plate 8 comprises a support section 82 and a bearing section 84 connected to the support section 82. The bearing section 84 is arranged to correspond to the lapping section 624, whereby in assembling, the lapping section 624 is placed on and overlaps the bearing section 84. The light guide plate 4 is carried on the support section 82 and the lapping section 624. The lapping section 624 and the bearing section 84 are arranged in a mated fashion so that the overall thickness of the PCB 62 and the heat dissipation plate 8 is substantially identical to the thickness of a conventionally used PCB, whereby while the performance of heat dissipation is enhanced, the thickness of the backlight module is not increased so as to help achieve device thinning.

Figure 3:
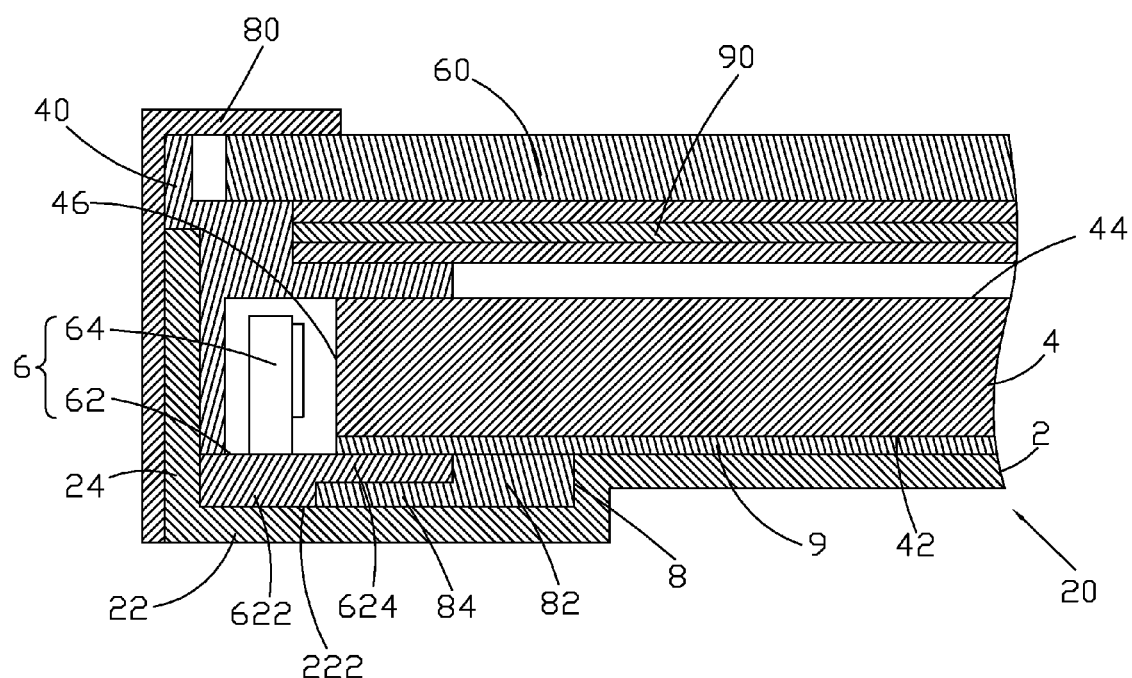
FIG. 3 is a cross-sectional view showing the structure of a liquid crystal display device according to the present invention.

Referring to FIG. 3, the present invention also provides a liquid crystal display device, which comprises: a backlight module 20, a mold frame 40 arranged on the backlight module 20, a liquid crystal display panel 60 arranged on the mold frame 40, a front bezel 80 arranged on the liquid crystal display panel 60, and an optical film assembly 90 arranged between the backlight module 20 and the liquid crystal display panel 60. The backlight module 20 functions to provide a planar light source. The mold frame 40 carries the liquid crystal display panel 60. The front bezel 80 retains the liquid crystal display panel 60 in the mold frame 40.

In the instant embodiment, the backlight module 20 comprises a backplane 2, a light guide plate 4 arranged in the backplane 2, a backlight source 6 arranged in the backplane 2, a heat dissipation plate 8 arranged between the backlight source 6 and the backplane 2, and a bottom reflector plate 9 arranged between the light guide plate 4 and the backplane 2. The backlight source 6 emits light that is reflected by the bottom reflector plate 9 toward or directly enters the light guide plate 4 to be transmitted in the light guide plate 4 in order to convert a point light source into a planar light source.

Specifically, referring to FIG. 3, the backplane 2 comprises a bottom plate 22 and a side plate 24 perpendicularly connected to the bottom plate 22. The bottom plate 22 of the backplane 2 comprises a recessed chamber 222 formed therein to correspond to the backlight source 6 and the heat dissipation plate 8, whereby the backlight source 6 and the heat dissipation plate 8 are received and retained in the recessed chamber 222. The backlight source 6 comprises a PCB (Printed Circuit Board) 62 and an LED (Light-Emitting Diode) chip 64 mounted on the PCB 62. The PCB 62 is mounted on the bottom plate 22 of the backplane 2 and the heat dissipation plate 8. The LED chip 64 generates heat that is transferred through the PCB 62 to the backplane 2 and the heat dissipation plate 8 and is subsequently subjected to heat exchange with the surroundings to be dissipated. Although the PCB 6 might have poor performance of heat dissipation, the heat dissipation plate 8 has excellent performance of heat dissipation and can compensate the poor heat dissipation performance of the PCB 62 to thereby enhance the quality of the backlight module.

The light guide plate 4 comprises a bottom surface 42 that faces the bottom plate 22 of the backplane 2, a top surface 44 opposite to the bottom surface 42, and a plurality of side surfaces between the bottom surface 42 and the top surface 44. The plurality of side surfaces comprises at least a light incidence surface 46. The LED chip 64 is arranged between the light guide plate 4 and the side plate 24 of the backplane 2 to correspond to the light incidence surface 46. Since the PCB 62 is arranged on the bottom plate 22 of the backplane 2 and since only the LED chip 64 is arranged between the side plate 24 of the backplane 2 and the light guide plate 4 to correspond to the light incidence surface 46, the distance between the light guide plate 4 and the side plate 24 of the backplane 2 can be effectively reduced so as to help achieve bezel slimming.

Further, the PCB 62 comprises a mounting section 622 and a lapping section 624 connected to the mounting section 622. The heat dissipation plate 8 comprises a support section 82 and a bearing section 84 connected to the support section 82. The bearing section 84 is arranged to correspond to the lapping section 624, whereby in assembling, the lapping section 624 is placed on and overlaps the bearing section 84. The light guide plate 4 is carried on the support section 82 and the lapping section 624. The lapping section 624 and the bearing section 84 are arranged in a mated fashion so that the overall thickness of the PCB 62 and the heat dissipation plate 8 is substantially identical to the thickness of a conventionally used PCB, whereby while the performance of heat dissipation is enhanced, the thickness of the backlight module is not increased so as to help achieve device thinning.

In summary, the present invention provides a backlight module and a liquid crystal display device using the backlight module, in which an LED chip is directly mounted to a PCB and the PCB is arranged on a bottom plate of a backplane to have the LED chip located between a light incidence surface of a light guide plate and a side plate of the backplane to achieve bezel slimming of a liquid crystal display device and further, a lapping section is provided on the PCB and a bearing section is formed on a heat dissipation plate to allow the lapping section and the bearing section to mate and engage with each other so as to achieve thinning of the liquid crystal display device while not increasing the thickness of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane, a backlight source arranged in the backplane, and a heat dissipation plate arranged between the backlight source and the backplane, the backplane comprising a bottom plate and a side plate perpendicularly connected to the bottom plate, the backlight source comprising a PCB (Printed Circuit Board) and an LED (Light-Emitting Diode) chip mounted on the PCB, the PCB being arranged on the bottom plate of the backplane and the heat dissipation plate, the PCB comprising a mounting section having a thickness and a lapping section connected to the mounting section and having a second thickness that is smaller than the first thickness and reduced from the first thickness by a thickness difference, the heat dissipation plate comprising a support section and a bearing section connected to the support section and having a third thickness that is substantially equal to thickness difference between the first and second thicknesses of the PCB, the bearing section being arranged to correspond to the lapping section, such that the lapping section is positionable on and overlapping the bearing section with a bottom surface of the mounting section of the PCB and a bottom surface of the heat dissipation plate substantially flush with each other to define a flat, continuous surface positioned on and in surface contact engagement with an inside surface of the bottom plate of the backplane, and the light guide plate is carried on the support section of the heat dissipation plate and the lapping section of the PCB.

2. The backlight module as claimed in claim 1, wherein the bottom plate of the backplane comprises a recessed chamber formed therein to correspond to the backlight source and the heat dissipation plate and the backlight source and the heat dissipation plate are received and retained in the recessed chamber.

3. The backlight module as claimed in claim 1, wherein the light guide plate comprises a bottom surface that faces the bottom plate of the backplane, a top surface opposite to the bottom surface, and a plurality of side surfaces between the bottom surface and the top surface, the plurality of side surfaces comprising at least a light incidence surface, the LED chip being arranged between the light guide plate and the side plate of the backplane to correspond to the light incidence surface.

4. The backlight module as claimed in claim 3 further comprising a bottom reflector plate arranged between the bottom surface of the light guide plate and the bottom plate of the backplane.

5. A liquid crystal display device, comprising: a backlight module, a mold frame arranged on the backlight module, a liquid crystal display panel arranged on the mold frame, and a front bezel arranged on the liquid crystal display panel, the backlight module comprising a backplane, a light guide plate arranged in the backplane, a backlight source arranged in the backplane, and a heat dissipation plate arranged between the backlight source and the backplane, the backplane comprising a bottom plate and a side plate perpendicularly connected to the bottom plate, the backlight source comprising a PCB (Printed Circuit Board) and an LED (Light-Emitting Diode) chip mounted on the PCB, the PCB being arranged on the bottom plate of the backplane and the heat dissipation plate, the PCB comprising a mounting section having a thickness and a lapping section connected to the mounting section and having a second thickness that is smaller than the first thickness and reduced from the first thickness by a thickness difference, the heat dissipation plate comprising a support section and a bearing section connected to the support section and having a third thickness that is substantially equal to thickness difference between the first and second thicknesses of the PCB, the bearing section being arranged to correspond to the lapping section, such that the lapping section is positionable on and overlapping the bearing section with a bottom surface of the mounting section of the PCB and a bottom surface of the heat dissipation plate substantially flush with each other to define a flat, continuous surface positioned on and in surface contact engagement with an inside surface of the bottom plate of the backplane, and the light guide plate is carried on the support section of the heat dissipation plate and the lapping section of the PCB.

6. The liquid crystal display device as claimed in claim 5, wherein the bottom plate of the backplane comprises a recessed chamber formed therein to correspond to the backlight source and the heat dissipation plate and the backlight source and the heat dissipation plate are received and retained in the recessed chamber.

7. The liquid crystal display device as claimed in claim 5, wherein the light guide plate comprises a bottom surface that faces the bottom plate of the backplane, a top surface opposite to the bottom surface, and a plurality of side surfaces between the bottom surface and the top surface, the plurality of side surfaces comprising at least a light incidence surface, the LED chip being arranged between the light guide plate and the side plate of the backplane to correspond to the light incidence surface.

8. The liquid crystal display device as claimed in claim 7, wherein the backlight module further comprises a bottom reflector plate arranged between the bottom surface of the light guide plate and the bottom plate of the backplane.

9. The liquid crystal display device as claimed in claim 5 further comprising an optical film assembly arranged between the backlight module and the liquid crystal display panel.

10. A liquid crystal display device, comprising: a backlight module, a mold frame arranged on the backlight module, a liquid crystal display panel arranged on the mold frame, and a front bezel arranged on the liquid crystal display panel, the backlight module comprising a backplane, a light guide plate arranged in the backplane, a backlight source arranged in the backplane, and a heat dissipation plate arranged between the backlight source and the backplane, the backplane comprising a bottom plate and a side plate perpendicularly connected to the bottom plate, the backlight source comprising a PCB (Printed Circuit Board) and an LED (Light-Emitting Diode) chip mounted on the PCB, the PCB being arranged on the bottom plate of the backplane and the heat dissipation plate, the PCB comprising a mounting section having a thickness and a lapping section connected to the mounting section and having a second thickness that is smaller than the first thickness and reduced from the first thickness by a thickness difference, the heat dissipation plate comprising a support section and a bearing section connected to the support section and having a third thickness that is substantially equal to thickness difference between the first and second thicknesses of the PCB, the bearing section being arranged to correspond to the lapping section, such that the lapping section is positionable on and overlapping the bearing section with a bottom surface of the mounting section of the PCB and a bottom surface of the heat dissipation plate substantially flush with each other to define a flat, continuous surface positioned on and in surface contact engagement with an inside surface of the bottom plate of the backplane, and the light guide plate is carried on the support section of the heat dissipation plate and the lapping section of the PCB;

wherein the bottom plate of the backplane comprises a recessed chamber formed therein to correspond to the backlight source and the heat dissipation plate and the backlight source and the heat dissipation plate are received and retained in the recessed chamber.

11. The liquid crystal display device as claimed in claim 10, wherein the light guide plate comprises a bottom surface that faces the bottom plate of the backplane, a top surface opposite to the bottom surface, and a plurality of side surfaces between the bottom surface and the top surface, the plurality of side surfaces comprising at least a light incidence surface, the LED chip being arranged between the light guide plate and the side plate of the backplane to correspond to the light incidence surface.

12. The liquid crystal display device as claimed in claim 11, wherein the backlight module further comprises a bottom reflector plate arranged between the bottom surface of the light guide plate and the bottom plate of the backplane.

13. The liquid crystal display device as claimed in claim 10 further comprising an optical film assembly arranged between the backlight module and the liquid crystal display panel.

\* \* \* \* \*